Feb. 1, 1966  P. GANCEL  3,232,388
TRAILING SHOE BRAKE
Filed March 19, 1962  3 Sheets-Sheet 3

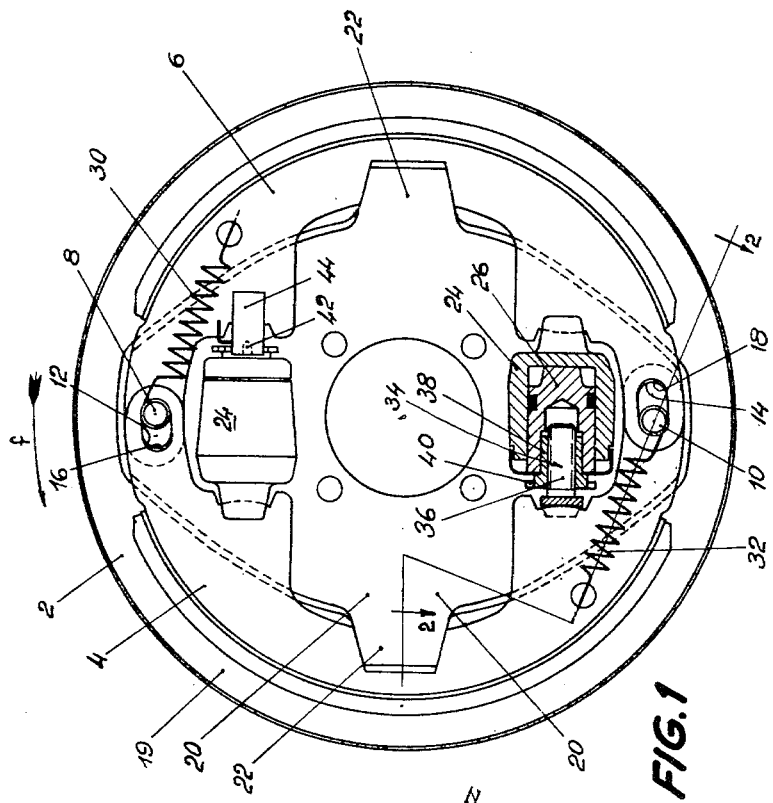
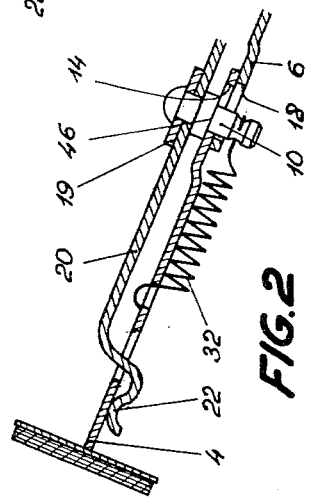

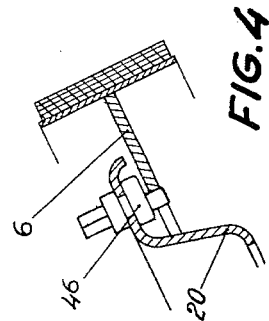
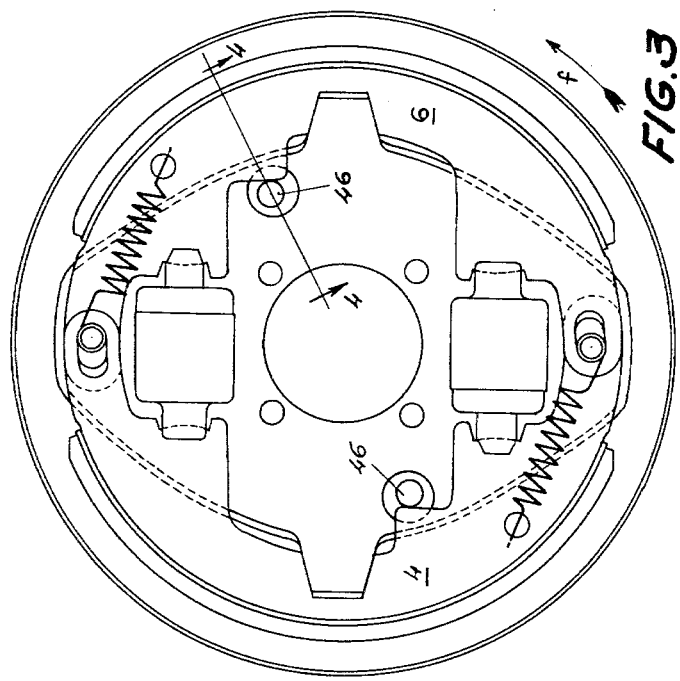

United States Patent Office 3,232,388
Patented Feb. 1, 1966

3,232,388
TRAILING SHOE BRAKE
Pierre Gancel, Paris, France, assignor to Societe Anonyme D.B.A., Paris, France, a company of France
Filed Mar. 19, 1962, Ser. No. 180,580
Claims priority, application France, Mar. 23, 1961, 856,524
8 Claims. (Cl. 188—78)

This invention relates to shoe brakes and more particularly to shoe brakes in which the shoes act as trailing shoes in both directions of rotation of the drum.

The invention aims at the provision of a shoe brake functioning as a two-trailing shoe brake in both directions of rotation of the drum, which is simple in structure and which is able to absorb high braking torques without any deformation of its parts.

On another hand the invention aims at the provision of a shoe brake in which the shoes are pivotated at their ends in order to increase the length of the lining and thus increase the effectiveness of the brake.

Shoe brakes are already known in which the operation as a two-trailing shoe brake in both directions of rotation of the drum is obtained by limiting to a predetermined degree the stroke of the applying means associated to the leading end of the shoes by means of abutments. After the applying means associated to the leading end of each shoe has engaged the respective abutment, the shoe is applied by the applying means associated to the trailing end of the shoe. However such construction has the drawback to require a strengthening of the applying means, and abutments which are distinct from the shoe anchoring means.

Shoe brakes are also known in which both shoes operate as trailing shoes during forward rotation, but function as leading shoes during rearward rotation.

The present invention has for its object to eliminate the above drawbacks by providing anchoring means associated with the shoe itself and adapted to eliminate the action of the applying means associated to the leading end of the shoes. According to the invention each brake shoe has at each end applying means adapted to spread apart the adjacent ends of the shoes and anchoring means, only the applying means associated with the trailing end of each shoe being effective in forward or reverse rotation of the drum, and each shoe anchoring only on the anchoring means associated to its leading end in both directions of rotation of the drum.

The invention will now be described in specific embodiments, given as examples, with reference to the accompanying drawings in which:

FIGURE 1 is a schematic view in elevation of a brake made in accordance with the invention;

FIGURE 2 is a view in section along line 2—2 of FIGURE 1;

FIGURE 3 is a view similar to FIGURE 1 showing a modification of the brake of FIGURE 1;

FIGURE 4 is a view in section along line 4—4 of FIGURE 3; and

Figure 5:
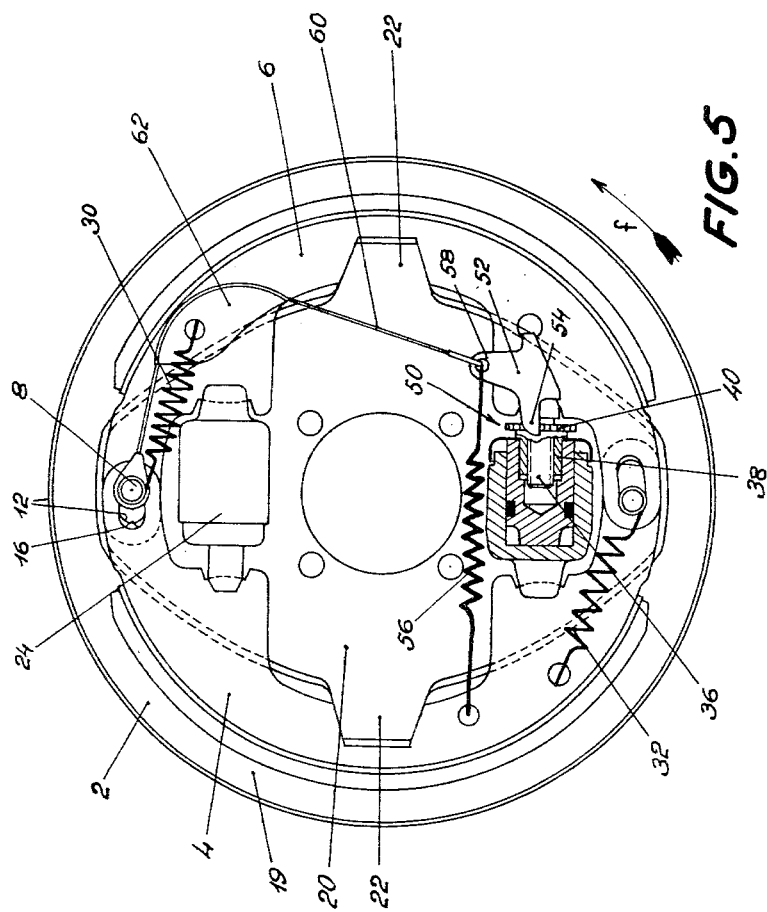
FIGURE 5 is a view similar to FIGURE 1 showing another modification of the brake of FIGURE 1.

The shoe brake for automotive vehicles shown in FIGURE 1 comprises a backing plate 2, which is secured by means of bolts (not shown) to a fixed part of the vehicle, and two shoes 4 and 6 lined with friction material and carried by the backing plate. Two anchor pins 8 and 10, secured to the backing plate at both ends of a diameter, are engaged in two elongated openings formed at the ends of the shoes. The upper pin 8 (FIGURE 1) is engaged in an elongated opening 12 formed in the shoe 6 and in an opening 16, which is longer than opening 12, formed in the shoe 4, while the pin 10 is engaged in an opening 14 of the shoe 4 and in a longer opening 18 of the shoe 6. It must be noted that openings 12 and 14, which are shorter than openings 16 and 18, do not extend the same length on opposite sides of the diametral plane defined by the axis of pins 8 and 10 for purposes which will be explained hereafter. The two shoes 4 and 6 are advantageously identical and, as shown in FIGURE 2, the shoe ends are slightly axially offset to allow their superposition on pins 8 and 10.

The backing plate 2 is formed of a protecting plate 19 and a support plate 20, which are generally welded one to the other. The support plate is provided with two arms 22 cooperating with return springs 30 and 32 to prevent undue lateral displacements of the shoes. As shown in FIGURE 2 the springs 30 and 32 have one of their ends offset and bias the web of the shoes against the arms 22.

There are provided two applying devices, each interposed between two adjacent ends of the shoes. Each applying device comprises a hydraulic cylinder 24 freely mounted on the backing plate and disposed generally in the plane of the shoe webs and radially inwardly of the anchoring pins 8 and 10. The cylinders are free to move with respect to the backing plate and are connected only to the fluid pressure supply lines (not shown) when the shoes are not mounted in the brake. The end of the lower cylinder 24 bears on the shoe 6 while a piston 26, slidably movable in the cylinder, bears against the shoe 4. The upper cylinder has a reverse position. The shoes are urged in their rest position by the return springs 30 and 32 stretched between the pin 8 and the shoe 6 and between the pin 10 and the shoe 4, respectively. The rest position of the upper end of shoe 4 and the lower end of shoe 6 is determined by engagement of the right hand end edge of opening 16 with the pin 8 and by engagement with the left hand end edge of opening 18 with the pin 10, respectively. The springs 30 and 32 act on their respective shoes to effect abutment of the pistons 26 with the bottom of their respective cylinders 24. The piston and cylinder assemblies act as rigid struts and therefore the amount the upper end of shoe 6 and the lower end of shoe 4 can be retracted is limited by engagement of the right hand end edge of opening 16 with the pin 8 and by engagement of the left hand end edge of opening 18 with pin 10.

In the initial brake release or rest position prior to brake lining wear, the right hand edge of opening 16 bears against the pin 8, the left hand end edge of the opening 14 bears against the pin 10, the spring 30 urges the right hand edge edge of the opening 12 against the pin 8, and the spring 32 urges the left hand end edge of the opening 14 against the pin 10 as shown in FIGURES 1 and 2.

As the linings on both shoes wear, the strut 36 is extended further out of the piston 26 by rotation of the sleeve 38 and the upper end of the shoe 6 is moved away from the pin 8 and the lower end of the shoe 4 is moved away from the pin 10 resulting in a varying clearance between the end edges of the openings 12 and 14 and the pins 8 and 10, respectively.

The openings 12 and 14 must be long enough to permit application of the shoes as the lining wears. In this particular configuration, the openings 16 and 18 are longer than the openings 12 and 14, respectively, to assure that the right hand end edge of the opening 14 will contact the pin 10 before the left hand end edge of opening 16 can contact the pin 8 and that the left hand end edge of opening 12 will contact the pin 8 before the right hand end edge of the opening 18 can contact the pin 10 during braking when the drum is rotating in the direction opposite to arrow F. However, the relative length of the openings depend upon the relative position of the openings with regard to their respective pins.

In each shoe the upper and lower openings extend on opposite sides of the diametral plane determined by the pins 8 and 10 in order that the shoes always anchor at their leading end during brake application. It is to be noted that the anchoring of the shoes on pins diametrically opposed permits the use of a lining having an arcuate length much longer than in conventional brakes.

Each piston 26 carries a manually actuated brake adjusting device 34 comprising a screw 36 and an internally threaded sleeve 38 received in a bore of the piston 26. The head of the screw 36 is slotted to receive the web of the corresponding shoe which prevents the rotation of the screw. The sleeve 38 is provided with a toothed annular flange for manually rotating the sleeve. Undesired rotation of the sleeve is prevented by a leaf spring 44 secured to the shoe and having a depressed portion 42 at one end engaged between two teeth of the flange. A tool such as a screw driver can be passed through an opening of the backing plate to rotate the sleeve 38 and bring the shoes closer to the friction surface of the drum.

The operation of the disclosed brake is as follows: assuming that the drum rotates in the direction of the arrow f in FIGURE 1, when fluid pressure is supplied to the cylinders 24 the adjacent ends of the shoes are spread apart. As soon as the shoes engage the drum the bottom of openings 16 and 18 comes into engagement with the respective anchor pin, and the shoes 4 and 6 pivot about the pins 8 and 10 respectively against the action of return springs 30 and 32. The shoes being anchored at their leading end function both as trailing shoes. When the direction of rotation of the drum is reversed the shoes still function as trailing shoes, the shoe 4 anchoring on pin 10 and the shoe 6 anchoring on pin 8.

When the pressure in the hydraulic cylinder is released, return springs 30 and 32 return the shoes in their rest position, shown in FIGURE 1.

During forward braking, corresponding to the rotation of the drum in the direction of the arrow in FIGURE 1, the shoes do not move a substantial distance from the rest position and there is no shock developed when the shoes engage the drum. But during reverse braking the whole length of the openings 12 and 14 must be taken up before the shoe abuts the respective anchor pin, and the energy which has been communicated to the shoes during this displacement can develop a shock; this shock can be damped by a sheath of suitable material telescoped over the pins.

FIGURES 3 and 4 show a modified form of the brake of FIGURE 1 in which the brake adjusting device comprises two eccentric members 46, one for each shoe, bearing against the edge of the shoe web. The rest positions of each shoe is then determined by abutment of the shoe web against the eccentric member and of the bottom of the openings 12, 14 against the anchor pins to which are attached the shoe return springs. The other parts of the brake are similar to those of the brake shown in FIGURE 1.

The brake shown in FIGURE 5 is equipped with an automatic brake adjusting device of the type disclosed in French Patent No. 1,178,740, filed on July 11, 1957, in the name of Bendix Aviation Corporation, in application to a duo-servo brake. The parts of the brake shown in FIGURE 5 which are similar to those of the brake shown in FIGURES 1 and 2 are designated by the same reference number.

The automatic brake adjusting device 50 comprises a screw 36 and a sleeve 38 which are similar to those shown in FIGURE 1, but the rotation of the sleeve is effected by means of a lever 52 pivoted on the shoe 6 and having a finger 54 engaging the toothed flange of the sleeve. The lever 52 is biased in its rest position by a spring 56 stretched between an arm 52 of the lever and the shoe 4. A cable 60 has one end attached to the arm 58 of the lever and its other end attached to the anchor pin 8, and is adapted to slide on a guide member 62 carried by the shoe 6.

If during an application of the brake, with the drum rotating in the direction opposite to that of arrow f, the displacement of guide member 62 is such that the finger 54 jumps over one tooth of the flange of sleeve 38, the lever 52 will rotate the sleeve 38 when returning to its rest position under the action of spring 56 and the shoes will be moved closer to the drum. For a more complete description of the structure and operation of this adjusting device reference may be had to French Patent No. 1,178,740 quoted above.

It must be noted that this adjusting device operates only during braking in reverse direction, because during braking in forward direction (direction of the arrow f) the end of shoe 6 which is adjacent to guide member 62 is only slightly displaced. The advantage of this mode of operation is the elimination of the influence of the thermal expansion of the drum due to braking in forward direction during an extended period of time.

Although a single adjusting device has been shown in FIGURE 5 for clarity sake, it is obvious that such an adjusting device is generally associated to each shoe.

The two trailing shoe brake has the advantage that it is less subject to "fading" than in conventional brakes due to the variation of the coefficient of friction of the lining in response to variations in the temperature of the brake. But in this brake the applying force to be exerted on the shoes to obtain a predetermined braking torque is higher than in two leading shoe brakes or even in a brake having one leading shoe and one trailing shoe. It is therefore advantageous to control the brake through the intermediary of a servomotor. When the brake is hydraulically actuated (as shown in the drawings) a power assisted master cylinder or a hydraulic pressure amplifier may be used.

The invention is obviously not limited to the described embodiments. The two trailing shoe operation of the brake can be obtained with anchoring means different from that described. The elongated openings in the shoes can be replaced by hook members; the ends of the shoes can be provided with pins engaged in elongated openings of the backing plate. The brake applying device including floating hydraulic cylinders which has been described is advantageous because it is simpler, less expensive and easier to adjust then a device including fixed cylinders having each two pistons. But it is obviously possible to use a floating control of another type, actuated by air pressure for example. Such modifications as well as others which provide mechanically equivalent devices must be considered as a part of the present invention.

What I claim is:

1. In a drum brake: a support member, a pair of brake shoes slidably mounted on said support member, actuating means disposed between each pair of adjacent ends of said shoes, anchoring means located on said support member adjacent each pair of adjacent ends of said shoes, anchor engaging means on each of said shoe ends disposed to anchor on a respective one of said anchoring means, each of said anchoring means being located between its respective said anchor engaging means on each end of said shoes and the center of the shoe on which its respective anchor engaging means is located whereby upon braking during drum rotation in either direction only the anchor engaging means on the leading edge of each brake shoe anchors on its respective one of said anchoring means of said support member.

2. In a drum brake: a support member, a brake shoe slidably mounted on said support member, actuating means disposed adjacent each end of said shoe, anchoring means on said support member adjacent each end portion of said brake shoe, a pair of abutment means carried by said brake shoe at each end portion for anchoring engagement with a respective one of said anchoring means during brake application, each of said anchoring means being located between its respective abutment means on said shoe and the center of said shoe whereby upon braking during drum rotation in either direction only the abutment means at the leading edge of said brake shoe member will engage its respective anchoring means during brake application.

3. In a drum brake: a support member, a pair of brake shoes slidably mounted on said support member, actuating means disposed between each pair of adjacent ends of said shoes, and elongated opening in each end of each of said brake shoes, each pair of adjacent brake shoe ends and their openings overlapping each other, a pair of anchor pins one of which extends through one pair of overlapping openings and the other of which extends through the other pair of overlapping openings, each of said openings having an anchoring edge for anchoring engagement with its respective anchor pin, each of said anchor pins being located between its respective anchoring edge and the center of the brake shoe on which the anchoring edge is located whereby upon braking during drum rotation in either direction only the anchoring edge of the openings at the leading edge of each of said brake shoes engage their respective anchor pin to anchor thereon during brake application.

4. The structure as recited in claim 3 wherein the elongated opening at one end of each of said shoes is of greater length than the elongated opening at the other end of each of said shoes, said brake shoes being disposed on said support member so that said one end of one of said shoes overlaps said other end of the other of said shoes.

5. The structure as recited in claim 3 wherein said actuating means is carried by and floats with said brake shoes.

6. In a drum brake: a rotatable drum, a support member, a pair of brake shoes slidably mounted on said support member, actuating means disposed between each pair of adjacent ends of said shoes, anchoring means located on said support member adjacent at least to one end of each of said shoes which is in a direction away from the center of each shoe and opposite to the rotation of said drum in at least one direction, means on said one end of each of said shoes disposed to anchor on a respective one of said anchoring means during brake application, each of said anchoring means being located between its respective said means on said one end of each of said shoes and the center of the shoe on which its respective means is located, a lost motion connection effecting engagement between said anchoring means and said brake shoe means when said shoes are moved by said drum in said one direction of drum rotation during brake application.

7. In a drum brake: a rotatable drum, a support member, a pair of brake shoes slidably mounted on said support member, actuating means disposed between each pair of adjacent ends of said shoes, anchoring means located on said support member adjacent at least to one end of each of said shoes which is in a direction away from the center of each shoe and opposite to the rotation of said drum in at least one direction, means on said one end of each of said shoes disposed to anchor on a respective one of said anchoring means, each of said anchoring means being located between its respective said means on said one end of each of said shoes and the center of the shoe on which its respective means is located whereby the leading edge of said shoes anchor on said anchoring means when said shoes are moved by said drum in said one direction of drum rotation during brake application.

8. In a drum brake: a support member, a brake shoe member slidably mounted on said support member, actuating means disposed adjacent each end of said shoe member, an elongated opening at each end of said shoe, a pair of abutment members on said support member extending through a respective one of said openings, each of said openings having an anchoring edge for anchoring engagement with its respective abutment member, each of said abutment members being located between its respective anchoring edge and the center of said shoe whereby upon braking during drum rotation in either direction the abutment member and the anchoring edge of its respective opening at the leading edge of said brake shoe will engage to effect anchoring of said brake shoe during brake application.

References Cited by the Examiner

UNITED STATES PATENTS

| | | | |
|---|---|---|---|
| 1,881,240 | 10/1932 | Pentz | 188—152 X |
| 2,050,121 | 8/1936 | Putch | 188—78 |
| 2,069,831 | 2/1937 | Hirschman et al. | 188—78 |
| 2,102,851 | 12/1937 | La Brie | 188—78 |
| 2,294,293 | 8/1942 | Geopfrich | 188—152 X |
| 2,319,583 | 5/1943 | Chambers | 188—78 |
| 2,372,415 | 3/1945 | Eksergian | 188—152 |
| 2,758,678 | 8/1956 | Sinclair | 188—78 |
| 2,966,238 | 12/1960 | Lauer et al. | 188—78 |

FOREIGN PATENTS 1,178,740  12/1958  France.

MILTON BUCHLER, *Primary Examiner.*

A. JOSEPH GOLDBERG, RALPH D. BLAKESLEE, EUGENE G. BOTZ, ARTHUR L. LA POINT,
*Examiners.*